United States Patent [19]
Bock et al.

[11] Patent Number: 5,091,136
[45] Date of Patent: Feb. 25, 1992

[54] METHOD OF RELIEF STAMPING MOTHER-OF-PEARL PLATES

[75] Inventors: Jürgen Bock, Pforzheim; Karola Metzger-Pegau, Straubenhardt; Wolfgang Zeller, Pfinztal, all of Fed. Rep. of Germany

[73] Assignee: Bock & Schupp GmbH & Co. KG, Pforzheim, Fed. Rep. of Germany

[21] Appl. No.: 717,470

[22] Filed: Jun. 19, 1991

[30] Foreign Application Priority Data

Mar. 14, 1991 [EP] European Pat. Off. ......... 91103922.0

[51] Int. Cl.$^5$ .............................................. B29C 43/10
[52] U.S. Cl. ...................................... 264/320; 264/73; 264/313
[58] Field of Search ................... 264/313, 320, 73, 74, 264/2.7

[56] References Cited

U.S. PATENT DOCUMENTS

| | | | |
|---|---|---|---|
| 3,660,211 | 5/1972 | Brody | 264/73 |
| 4,105,733 | 8/1978 | Bonfanti | 264/108 |

*Primary Examiner*—James Lowe

[57] ABSTRACT

In a method of making relief structures on mother-of-pearl layers removed from the shells of mollusks a portion of the layer is disposed on a negative mold having a relief shape formed therein, a modelling material is disposed on the layer portion and the layer portion is pressed into engagement with the negative mold by way of a planar stamp pressing onto the modelling material thereby relief-shaping the mother-of-pearl layer.

2 Claims, No Drawings

METHOD OF RELIEF STAMPING MOTHER-OF-PEARL PLATES

BACKGROUND OF THE INVENTION

The invention relates to a method of making decorative mother-of-pearl structures wherein the mother-of-pearl is present as a layer removed from the shells of mollusks.

Mother-of-pearl has been used already in antique times particularly for inlaid work because of its special light effects. Mother-of-pearl is the innermost layer of the shell of mollusks, particularly of oysters and snails. Incident light rays are refracted in this layer by interference in such a manner that iridescent colors are exhibited. Up to this time, parts of such shell layers are utilized especially for inlays wherein the outer shell layers may be ground or cut. In modern production facilities however only mother-of-pearl structures are utilized which consist of the mother-of-pearl layer removed from the shells. These are thin layers or foils of a thickness of about 0.2 mm which are very brittle and break easily since they consist of carbonates. It has been taken for granted therefore that the shapes of these foils cannot be changed. However, in order to make relief-type fashion or ornamental articles the mother-of-pearl was form-cut from the exposed side thereof. However form cutting is possible only with very thick and therefore expensive mother-of-pearl layers. Also, the cutting disturbs the beautiful iridescent light effects of the mother-of-pearl. As a result articles so manufactured have not been successful.

It is therefore the object of the present invention to provide a process of making relief-shaped articles from thin, brittle mother-of-pearl foils or layers in a simple and economical manner and without losses in the iridescent effects of the material.

SUMMARY OF THE INVENTION

A method of relief stamping mother-of-pearl layers wherein such layer is disposed on a negative mold having the desired relief shape formed therein. A modelling material with a thickness of at least the height of the relief shape is disposed on the mother-of-pearl layer and the layer is then forced into form-engagement with the mold by a planar stamp disposed on the modelling material. With this method hydraulic forces are evenly applied to the whole layer surface thereby gently moving the mother-of-pearl layer into the desired shape without causing breakage thereof. A noticeable relief outline can be achieved with this method.

The term "stamping" is generally used in connection with solid or massive material forming (embossing) or hollow or flat pressing. During solid or massive stamping the material is exposed to such high pressures that it flows and fills the cavities of the stamping mold; during hollow forming or stamping a flat material sheet is pressed into a mold cavity such that it assumes the shape of the cavity whereby however its thickness is not changed. Any raised area at one side has a corresponding recessed area on the other side of the sheet. During flat pressing or stamping (burnishing) portions of a material are subjected to stamp forces such that rough areas are smoothened. It is the general understanding that there are materials which can be subjected to stamping, that is, materials which have sufficient plasticity or malleability that they can be shaped under high pressure at normal temperature to change their shape, and there are other materials which do not have this capability.

Mother-of-pearl is one of the materials which is considered to be very brittle, that is, to have insufficient malleability so that, by definition, it could not be subjected to a stamping process. Mother-of-pearl consists of planar parallel platelets of argonite which are cemented together by konchioline. The planar parallel platelet arrangement is the cause for the light interference mentioned earlier which provides for the iridescent light effects. The inventor believes that, under certain conditions, the cementing of the planar parallel argonite platelets permits a rearrangement of the platelets relative to one another to a limited degree such that some shaping of the mother-of-pearl material by damping becomes possible if the stamping procedure is performed in accordance with the present invention. In any case, the inventor found that such shaping can be achieved with the method according to the present invention, wherein the modelling material applied to the mother-of-pearl material before stamping acts as a hydraulic force transmitter which evenly distributes the pressure of the stamp over the whole surface area of the mother-of-pearl material to be shaped such that no part of the mother-of-pearl is subjected to concentrated load forces. The inventor speculates that this is the reason that permits slight rearrangement of the platelets. In any case, it has been found that, if treated in accordance with the present invention, the highly brittle and fragile mother-of-pearl layers can be provided with clearly noticeable embossed shapes. Such embossed or form-stamped mother-of-pearl layer parts can then be further processed, that is, they may, for example, be cemented on other members for use in connection with fashion jewelry or decorative purposes. They may still be used for inlay artwork whose attraction would then even be enhanced by the relief appearance or they may be used for medallions or disk-like fashion jewelry and also as attractive dial faces for watches. Also the embossed sections of the mother-of-pearl may be stamped along the edges of the embossments and disposed on a corresponding support member such that, for example, cameo-like gems with highly attractive appearance are generated.

As modelling material, a mineral wax including a relatively large amount of organic filler materials has been found to be suitable.

The furnished relief-stamped mother-of-pearl layers have noticeable relief shapes formed on the surfaces thereof without any loss of iridescence. In fact additional light effects are generated presumably because the normally parallel platelets of which a mother-of-pearl layer is composed are moved to somewhat different angles with respect to one another so that the incidence angle of the light is slightly different for adjacent platelets.

What is claimed is:

1. A method of producing relief structures on mother-of-pearl layers removed from the shells of mollusks, wherein a portion of the layer is disposed on a negative mold having the desired relief shape formed therein, a modelling material with a thickness of at least the height of the relief shape is disposed on the exposed side of the mother-of-pearl layer which is then embossed by a planar stamp pressing onto the modelling material to force the mother-of-pearl foil portion into form-engagement with said negative mold.

2. A method according to claim 1, wherein said modelling material consists of a mineral wax including organic filler materials.

* * * * *